United States Patent [19]

Traenckner et al.

[11] 4,404,298
[45] Sep. 13, 1983

[54] AQUEOUS DISPERSIONS BASED ON CELLULOSE NITRATES, POLYESTER OF ALKYD RESINS AND AMINOPLAST RESINS, PROCESSES FOR THE PRODUCTION THEREOF AND THE USE THEREOF FOR THE PRODUCTION OF COATINGS

[75] Inventors: Hans-Joachim Traenckner, Krefeld; Wolfgang Kremer, Kerken, both of Fed. Rep. of Germany

[73] Assignee: Bayer Aktiengesellschaft, Leverkusen, Fed. Rep. of Germany

[21] Appl. No.: 337,020

[22] Filed: Jan. 4, 1982

[30] Foreign Application Priority Data

Jan. 10, 1981 [DE] Fed. Rep. of Germany ....... 3100576

[51] Int. Cl.$^3$ ............................................... C08L 1/18
[52] U.S. Cl. ....................................... 524/31; 524/33; 524/598; 524/601; 428/528

[58] Field of Search ................... 524/31, 33, 598, 597, 524/601; 536/30, 35; 106/170, 186, 187; 428/528

[56] References Cited

U.S. PATENT DOCUMENTS

| | | | |
|---|---|---|---|
| 2,937,153 | 5/1960 | Rasmussen et al. | 524/33 |
| 3,370,025 | 2/1968 | Salo et al. | 524/39 |
| 3,450,652 | 6/1969 | Lin | 524/33 |
| 3,522,070 | 7/1970 | Webb, Jr. | 524/31 |
| 3,551,367 | 12/1970 | Gasper et al. | 528/295.5 |
| 3,615,792 | 10/1971 | Keene | 524/31 |
| 4,177,172 | 12/1979 | Traenckner et al. | 524/31 |

Primary Examiner—John Kight, III
Assistant Examiner—Nathan M. Nutter
Attorney, Agent, or Firm—Connolly and Hutz

[57] ABSTRACT

Nitrocellulose/polyester or alkyd resin dispersions having a high pot life and low requirement for coalescing agent may be prepared with the aid of water-insoluble aminoplast resins if care is taken to ensure that a mixture of these components is present within the particles of the disperse phase.

8 Claims, No Drawings

AQUEOUS DISPERSIONS BASED ON CELLULOSE NITRATES, POLYESTER OF ALKYD RESINS AND AMINOPLAST RESINS, PROCESSES FOR THE PRODUCTION THEREOF AND THE USE THEREOF FOR THE PRODUCTION OF COATINGS

This invention relates to aqueous cellulose nitrate/polyester (or alkyd resin) dispersions containing a water-insoluble aminoplast resin as constituent of the disperse phase, a process for the production of such dispersions and the use thereof for the production of coatings.

Aqueous coating compounds are becoming increasingly important, not only for ecological reasons, but also because the ever increasing cost of lacquer raw materials necessitates extreme economy in the use of organic solvents, i.e. they should as far as possible be used only where they may be recovered without substantial loss.

Aqueous dispersions hold out a prospect of ecologically and economically more advantageous use of organic solvents.

Aqueous cellulose nitrates/plasticizer dispersions which may be modified inter alia with alkyd resins are disclosed in German Auslegeschrift No. 1,286,672. They should contain the disperse phase in the form of spherical particles measuring from 0.1 to 0.8μ in diameter and are produced by dissolving cellulose nitrate in a volatile organic solvent, dispersing the resulting solution in water in the presence of an emulsifier and distilling off the solvent. This process, however, is found to be unsuitable for the preparation of finely divided stable dispersions which contain alkyd resins in addition to cellulose nitrate.

As a further development of the state of the art, German Offenlegungsschrift No. 2,853,578 and U.S. Pat. No. 4177 172 discloses that exceptionally finely divided cellulose nitrate/alkyd resin dispersions are obtained when the emulsifier used consists of:

(I) a partially saponified polyvinyl acetate having a degree of hydrolysis of from 70 to 97%;
(II) a polyvinyl pyrrolidone; and/or
(III) a hydrolysed vinyl acetate/vinyl pyrrolidone copolymer, in which the particle size of the disperse phase is from 0.1 to 1.5μ.

The coatings obtained from dispersions according to German Offenlegungsschrift No. 2,853,578 are resistant to water and to alcohol, but not to aqueous alcohol. If water-soluble aminoplasts are added to the dispersions according to German Offenlegungsschrift No. 2,853,578 in order to obtain chemically more resistant coatings by cross-linking, the pot life of the dispersion is reduced to a few hours after the addition of acid catalyst, although cellulose nitrate/alkyd resin lacquers based on organic solvents have a pot life of over 24 hours even after the addition of acid.

The so-called "active primer process" in which a cellulose nitrate/alkyd resin dispersion which contains acid, but is free from aminoplast, is applied as a primer ground which is subsequently covered with an acid-free cellulose nitrate/alkyd resin/aminoplast dispersion as top coat lacquer overcomes the problem of insufficient pot life, but is complicated and necessitates separate storage of the different components (two component system). There was therefore a demand for aqueous cellulose nitrate/polyester (or alkyd resin)/aminoplast resin dispersions which would still have a pot life of at least 24 hours even after the addition of acids. It would also be desirable to keep the quantity of coalescing agent (i.e. solvents which may be diluted with water, such as glycol ethers or short chain alcohols) as low as possible.

It has now been found that water-insoluble aminoplast resins may unexpectedly be used for the production of aqueous cellulose nitrate/polyester or alkyd resin/aminoplast resin dispersion which will have the necessary pot life even after the addition of acid and will give rise to clear, uncloudy films with only a small quantity of coalescing agent, provided the particles of the disperse phase contain a mixture of cellulose nitrate polyester or alkyd resin and water-insoluble aminoplast resin. Such dispersions may easily be prepared by first mixing cellulose nitrate, polyester or alkyd resin and water-insoluble aminoplast resin and then dispersing the resulting mixture in water.

The present invention also relates to aqueous dispersions of
(A) from 5 to 35 parts, by weight, of cellulose nitrate;
(B) from 5 to 30 parts, by weight, of polyester and/or alkyd resin;
(C) from 4 to 40 parts, by weight, of aminoplast resin;
(D) from 30 to 300 parts, by weight, of water; and
(E) from 0.5 to 10 parts, by weight, of emulsifier;
characterised in that the aminoplast resin (C) is insoluble in water and that a mixture of components (A), (B) and (C) is present within the particles of the disperse phase.

"Water-insoluble" means in this context that not more than 1 g of aminoplast resin (C) may be dissolved in 100 g of water at 25° C. to form a clear solution without the aid of additives.

The present invention also relates to a process for the production of aqueous dispersions from:
(A) from 5 to 35 parts, by weight, of cellulose nitrate;
(B) from 5 to 30 parts, by weight, of polyester and/or alkyd resin;
(C) from 4 to 40 parts, by weight, of aminoplast resin;
(D) from 30 to 300 parts, by weight, of water; and
(E) from 0.5 to 10 parts, by weight, of emulsifier;
characterised in that the cellulose nitrate (A), polyester and/or alkyd resin (B) and water-insoluble aminoplast resin (C) are combined and the resulting mixture is dispersed in water in the presence of emulsifier (E).

The present invention further relates to the use of these aqueous dispersions for the production of coatings.

The aqueous dispersions according to the present invention have a pot life of at least 24 hours even after the addition of acids, e.g. p-toluene sulphonic acid, and result in coatings which are resistant inter alia to water, alcohol and aqueous alcohol.

While, for example, aqueous cellulose nitrate/alkyd resin/aminoplast resin dispersions according to German Offenlegungsschrift No. 2,072,986 would generally require the addition of from 12 to 17%, by weight, based on the finished lacquer, of coalescing agent to produce clear, uncloudy films, lacquers based on the dispersions according to the present invention generally require at the most 7.5%, by weight, of coalescing agent to achieve the same result, thus providing a saving in raw material which was not forseeable.

The cellulose nitrates (A) may be various types of nitrocellulose, but the conventional collodion cotton quantities are preferred, i.e. cellulose nitric acid esters having a nitrogen content of from 10.2 to 12.4%, by weight.

It is immaterial to the present invention whether the collodion cotton used is in a form moist with butanol, isopropanol, ethanol, methanol or water or whether celluloid type masses (generally known as chips) containing gelatinising plasticisers are used.

Preferred nitrocellulose plasticisers include in particular phthalic acid esters and adipic acid esters of alcohols having from 4 to 8 carbon atoms, e.g. dibutyl phthalate, diisobutyl carbinyl phthalate, dicyclohexyl phthalate, dioctyl phthalate, dibutyl phthalate, dioctyl adipate, phosphoric acid esters of alcohols having from 6 to 10 carbons atoms, e.g. tricresyl phosphate, triphenyl phosphate, trioctyl phosphate, cresyl phenyl phosphate, dioctyl phenyl phosphate, but also diethylene glycol monolaurate, dipentaerythritol hexapropionate, 2-methoxy ethyl acetyl-tributyl aconitate, butoxyethyl diglycol carbonate, acetyl tributyl citrate, triethylene glycol pelargonate, butyl diglycol carbonate, polyethylene glycol-di-2-ethyl hexoate, triethylene glycol-di-2-ethyl butyrate, tributyl carballylate, dibutyl sebacate and benzene sulphonic acid-N-methylamide.

The term "alkyd resin" is used herein to mean fatty acid-modified and oil-modified polyesters.

By "alkyd resins" and "polyesters (B)" are meant the type of polycondensates prepared by known methods of condensation of alcohols and carboxylic acids which have been defined, for example in Römpp's Chemielexikon, volume 1, page 202, publishers Franckh's Verlagsbuchhandlung, Stuttgart 1966, or described in Ullmanns Enzykolopädie der Technischen Chemie and in D. H. Solomon The Chemistry of Organic Filmformers, page 75 to 101, Robert E. Krieger Publishing Company, New York 1977.

Preferred alcohols for the synthesis of the polyesters and alkyd resins (B) include aliphatic, cycloaliphatic and/or araliphatic alcohols having from 1 to 15, preferably from 2 to 6, carbon atoms and from 1 to 6, preferably from 1 to 4, OH groups per molecule attached to non-aromatic carbon atoms, e.g. glycols, such as ethylene glycol, propane diol-(1,2) and -(1,3), butane diol-(1,2), (1,3) and (1,4), 2-ethyl-propne diol-(1,3), 2-ethylhexane diol-(1,3), neopentyl glycol, hexane diol-(1,6), cyclohexane diol-(1,2) and -(1,4), 1,2- and 1,4-bis-(hydroxymethyl)-cyclohexane, and adipic acid -bis(ethylene glycol esters); ether alcohols, such as di- and triethylene glycol and dipropylene glycol; ethoxylated and perhydrogenated bisphenols; butane triol-(1,2,4), hexane triol-(1,2,6), trimethylol ethane, trimethylol propane, glycerol, pentaerythritol, dipentaerythritol, mannitol and sorbitol; and chain-terminating monohydric alcohols having from 1 to 6 carbon atoms, such as propanol, butanol, cyclohexanol and benzyl alcohol. The most frequently used alcohols are glycerol, trimethylol propane, neopentyl glycol and pentaerythritol.

The acid components used for the synthesis of the polyesters and alkyd resins (B) are preferably aliphatic, cycloaliphatic saturated or unsaturated and/or aromatic polybasic carboxylic acids, preferably di-, tri- and tetracarboxylic acids having from 2 to 14, preferably from 4 to 12, carbon atoms per molecule or derivatives thereof which are capable of esterification (e.g. anhydrides or esters), e.g. phthalic acid anhydride, isophthalic acid, terephthalic acid, tetrahydro- and hexahydro-phthalic acid anhydride, endomethylene tetrahydrophthalic acid, succinic acid, adipic acid, sebacic acid, trimellitic acid, and trimellitic acid anhydride, pyromellitic acid anhydride and maleic acid. Phthalic acid anhydride is the most frequently used acid component.

The monocarboxylic acids used for the production of the polyesters or alkyd resins (B) are preferably aliphatic, cycloaliphatic, saturated or unsaturated and/or aromatic monocarboxylic acids having from 3 to 24 carbon atoms per molecule, such as benzoic acid, p-tertiary-butyl benzoic acid, toluic acid, hexahydrobenzoic acid, abietic acid and lactic acid.

In the alkyd resins (B) used for the dispersions according to the present invention, the oil length calculated as triglyceride and based on the alkyd resin is generally from 5 to 50%, preferably from 20 to 40%, by weight. Drying or non-drying fatty acids which generally contain from 6 to 24 carbon atoms may be used either as such or in the form of the glyceric esters thereof (triglycerides).

It is preferred to use vegetable and animal oils, fats or fatty acids, such as coconut oil, ground nut oil, castor oil, wood oil, olive oil, soya bean oil, linseed oil, cotton seed oil, safflower oil or fatty acids thereof, dehydrated castor oil or castor oil fatty acid, mono-unsaturated fatty acids, lard, tallow, train oil and tall oil fatty acids, as well as synthetic fatty acids obtainable by the conjugation or isomerisation of natural unsaturated oils or fatty acids. Examples of preferred saturated fatty acids include coconut oil fatty acids, $\alpha$-ethyl-hexanoic acid, isononanoic acid (3,4,4-trimethyl-hexanoic acid), palmitic and stearic acid and synthetic saturated branched chain fatty acids.

The molecular weight of the polyesters and alkyd resins (B) determined as numerical average may range from 2,000 to 10,000 (molecular weights up to 5,000 determined by vapour pressure osmometry in dioxane and acetone, the lower value being taken as correct where differing values are obtained; molecular weights above 5,000 are determined by membrane osmometry in acetone).

The polyesters and alkyd resins (B) may be prepared by known methods of polycondensation. The starting materials are generally polycondensed with elimination of water at temperatures of from 140° to 250° C. in an atmosphere of inert gas, e.g. nitrogen, until the desired acid number is reached.

The polyesters or alkyd resins (B) are used in a non-neutralised or neutralised state.

Water-insoluble aminoplast resins (C) for the purposes of the present invention may be modified or unmodified, plasticised urea resins, melamine resins and carbamic acid ester resins in the wider sense, also generally known as "urethane resins", as well as guanamine and sulphonamide resins. These resins are condensation products of formaldehyde with urea, melamine, diaminotriazine or sulphonamide, and are usually prepared in an alkaline medium.

In order to obtain aminoplast resins which are soluble in the conventional organic solvents the highly polar groups must be etherified, in the case of simple aminoplasts with butanol, while more complicated aminoplasts also become soluble in organic solvents when etherified with methanol.

The products obtained are then low molecular weight precondensates having an average molecular weight Mn of from 600 to 1,400 (determined by vapour pressure osmometry in xylene; see Wagner Sarx, Lackkunstharze, publishers Carl Hanser Verlag, Munich, 1971, pages 61–78, and Ullmann's Encyclopadie der Technischen Chemie, publishers Verlag Chemie, Weinheim Bergstrasse, 1973, page 403).

Preferred emulsifiers (E) are selected from the following:
- (I) partially saponified polyvinyl acetate having a degree of hydrolysis of from 70 to 97%, preferably from 80 to 92%, in particular from 86 to 89%;
- (II) polyvinyl pyrrolidone; and
- (III) hydrolysed vinyl acetate/vinyl pyrrolidone copolymers.

The term "hydrolysed" when used in connection with (III) refers to the acetate group of the vinyl acetate units.

Preferred emulsifiers (E) are polyvinyl alcohols (I) prepared, for example, by hydrolysis of polyvinyl acetate. They generally have an average molecular weight of from 5,000 to 100,000, preferably from 10,000 to 50,000, in particular from 25,000 to 40,000, determined as numerical average by gel permeation chromatography as described by L. K. Koopal in Communications Agriculture University Wageningen, The Netherlands, 78/12 (1978).

The polyvinyl pyrrolidones (II) used as emulsifiers (E) generally have a K value of from 25 to 100, determined as described in the technical memorandum "Luviskol K" of November 1974 of BASF AG.

The saponified vinyl acetate/vinyl pyrrolidone copolymers (III) used as emulsifiers (E) generally have a pyrrolidone content of 50 mol% and a K value of from 20 to 40, determined as described in the technical memorandum "Luviskol VA" of March 1976 of BASF AG.

The dispersions according to the present invention may be produced by dissolving components (A)–(C) in a polar, water-insoluble organic solvent, combining the resulting solution with the aqueous solution of emulsifier (E) and forming an oil-in-water dispersion by powerful shearing forces. The organic solvent may subsequently be distilled off. Preferred organic solvents for this purpose include $C_1$–$C_4$ alkyl esters of acetic acid and of propionic acid, such as methyl, ethyl, propyl and isopropyl acetate and propionate.

The aqueous dispersion obtained may be further diluted with water or with coalescing agent.

Preferred coalescing agents are: ethylene glycol monomethyl ether, ethylene glycol monoethyl ether, ethylene glycol monobutyl ether acetate, diethylene glycol, diethylene glycol monobutyl ether, diacetone alcohol, methyl glycol acetate, methylamyl ketone and diisobutyl ketone. The quantity of coalescing agent depends on the viscosity of the dispersed resins and on the temperature at which the lacquer is to be dried.

Various types of apparatus with sufficiently high speeds of rotation e.g. from 5 to 50, preferably from 10 to 30, m/sec, are suitable for producing the dispersions. Under these conditions, dispersions of spherical disperse particles having an average diameter of from 0.1 to 1.5$\mu$, preferably from 0.1 to 0.5$\mu$, may be prepared within 1 to several minutes. The particle size may be determined by photocorrelation spectroscopy.

Catalytic quantities, preferably from 1 to 8%, by weight, of an acid, e.g. p-toluene sulphonic acid, may be added to the dispersions according to the present invention before they undergo hardening, which generally takes place at temperatures of from 20° to 50° C. The dispersions are eminently suitable for the production of gloss coatings, in particular on wood.

The parts mentioned in the following Examples are parts, by weight, and the percentages are percentages, by weight.

EXAMPLES

Example A

A solution in ethyl acetate was prepared from the following components:
- 93.75 g of nitrocellulose chips consisting of 82% of collodion wool containing ca. 12% nitrogen (standard 24E acccording to DIN 53 179) and 18% dibutyl phthalate as plasticiser,
- 93.75 g of ground nut oil fatty acid alkyd resin having an oil content of 41%,
- 78.1 g of a butoxylated, non-plasticised urea/formaldehyde resin dissolved to form an 80% solution in ethyl acetate, and
- 360 g of ethyl acetate.

A clear solution was obtained after ca. 3 hours stirring. This solution was combined with 375 g of a 3% aqueous polyvinyl alcohol solution (molecular weight 40,000, degree of hydrolysis from 86 to 89%) with slow stirring. The mixture was then dispersed for 5 minutes, using an "Ultra Turax (Type 45)" laboratory dispenser, by increasing the speed of rotation continuously to 10,000 revs/min. The solvent was distilled off under reduced pressure. The dispersion obtained had a solids content of 41.8% and a viscosity corresponding to an outflow time of 62 sec (DIN 53 211, DIN cup 4).

36 g of a 2% aqueous methyl cellulose solution were introduced into a 500 ml vessel. A mixture of 6 g of methyl glycol, 6 g of ethyl glycol, 6 g of methyl glycol acetate, 6 g of ethyl glycol acetate, 6 g of diacetone alcohol and 30 g of water was slowly introduced, using a laboratory dissolver at from 2,000 to 3,000 revs/min, and the contents of the vessel were stirred for 2 minutes. The resulting mixture was introduced with stirring into 206 g of the dispersion obtained as described above. In addition, a 25% aqueous solution of 4.6 g of p-toluene sulphonic acid was added.

The lacquer obtained was applied to glass plates to form a film having a wet film thickness of 180 $\mu$m. The pendulum hardness according to DIN 53 157 was determined after 10 minutes drying at 50° C. and a further 24 hours storage at room temperature. The viscosity of the lacquers was determined at various times by the method according to DIN 53 211 using a DIN cup 4.

Example B

A dispersion was prepared from the following components by a method analogous to that of Example A:
- 118.3 g of nitrocellulose consisting of 65% collodion wool containing ca. 12% nitrogen (standard 24E according to DIN 53 179) and 35% of water, and 16.90 g of dibutyl phthalate (plasticiser),
- 93.75 g of ground nut oil fatty acid alkyd resin having an oil content of 41%,
- 78.1 g of a butoxylated, non-plasticised urea/formaldehyde resin, dissolved to form an 80% solution in ethyl acetate, and
- 360 g of ethyl acetate.

A homogeneous emulsion was obtained after ca. 1 hour. This emulsion was combined with 333 g of a 3.4% aqueous polyvinyl alcohol solution (molecular weight 40,000, degree of hydrolysis from 86 to 89%) with slow stirring. The subsequent procedure was analogous to that of Example A.

Preparation of the lacquer and testing were carroed out as in Example A.

Example C (Comparison)

100 g of nitrocellulose chips consisting of 82% collodion wool containing ca. 12% nitrogen (standard 24E according to DIN 53 179) and 18% dibutyl phthalate, 100 g of ground nut oil fatty acid alkyd resin having an oil content of 41%, and 300 g of ethyl acetate were combined.

A clear solution was obtained after slow stirring for ca. 3 hours. This solution was combined with 300 g of a 3% aqueous polyvinyl alcohol solution (molecular weight $\overline{M}n$ 40,000, degree of hydrolysis from 86 to 89%) with slow stirring. The mixture was then dispersed for 5 minutes, using an "Ultra Turax Type 45" laboratory disperser, by increasing the speed of rotation continuously to 10,000 revs/min.

The solvent was distilled off under reduced pressure. The dispersion obtained had a solids content of 41.8% and a viscosity corresponding to an outflow time of 34 sec. (DIN 53 211, DIN cup 4).

A lacquer was prepared by a method analogous to that of Example A from 150 g of the dispersion obtained, 33 g of a methylated urea/formaldehyde resin (60% aqueous solution), 9 g of methyl glycol, 9 g of ethyl glycol, 9 g of methyl glycol acetate, 9 g of ethyl glycol acetate, 9 g of diacetone alcohol, 36 g of water and 36 g of a 2% aqueous methyl cellulose solution, and the lacquer was applied, dried and tested.

The quantitative proportions of the individual components in lacquers A to C are identical except for the quantity of coalescing mixture. The quantity of coalescing agent was chosen to provide lacquer films of equal clarity and equally levelling flow.

The results of the lacquer tests are shown in the following Table.

| | Pendulum hardness (sec) | Outflow time (sec) after storage for | | | | | |
|---|---|---|---|---|---|---|---|
| | | 0 | 1 | 2 | 4 | 8 | 16 | 20 hrs |
| A | 169 | 41 | 66 | 72 | 79 | 93 | 120 | 122 |
| B | 165 | 45 | 49 | 72 | 76 | 100 | 113 | 117 |
| C | 170 | 46 | 58 | 99 | —* | — | — | — |

*No longer measurable
All lacquers tested provided clear, glossy coatings.

What is claimed is:

1. Aqueous dispersion of:
    (A) from 5 to 35 parts, by weight, of cellulose nitrate;
    (B) from 5 to 30 parts, by weight, of polyester and/or alkyd resin;
    (C) from 4 to 40 parts, by weight, of aminoplast resin;
    (D) from 30 to 300 parts, by weight, of water; and
    (E) from 0.5 to 10 parts, by weight, of emulsifier;
characterised in that aminoplast resin (C) is insoluble in water and a mixture of components (A), (B) and (C) is present within the particles of the disperse phase.

2. Dispersions acccording to claim 1, characterised in that the disperse phase contains spherical particles having an average size of from 0.1 to 1.5 µm.

3. Dispersions according to claim 1, characterised in that the disperse phase contains spherical particles having an average size of from 0.1 to 0.5 µm.

4. Dispersions according to claim 1, characterised in that the emulsifier is selected from the group consisting of:
    (I) partially saponified polyvinyl acetate having a degree of hydroylsis of from 70 to 97%;
    (II) polyvinyl pyrrolidone; and
    (III) hydrolysed vinyl acetate/vinyl pyrrolidone copolymer.

5. Dispersions according to claim 4, characterised in that the partially saponified polyvinyl acetate (I) has a degree of hydroylsis of from 80 to 92%.

6. Dispersions according to claim 4, characterised in that the partially saponified polyvinyl acetate (I) has a degree of hydroylsis of from 86 to 89%.

7. Process for the preparation of aqueous dispersions of:
    (A) from 5 to 35, parts, by weight, of cellulose nitrate;
    (B) from 5 to 30 parts, by weight, of polyester and/or alkyd resin;
    (C) from 4 to 40 parts, by weight, of aminoplast resin;
    (D) from 30 to 300 parts, by weight, of water; and
    (E) from 0.5 to 10 parts, by weight, of emulsifier;
characterised in that cellulose nitrate (A), polyester and/or alkyd resin (B) and water-insoluble aminoplast resin (C) are combined and the resulting mixture is dispersed in water in the presence of emulsifier (E).

8. Process according to claim 7, characterised in that components (A)–(C) are dissolved in a water-insoluble organic solvent, the resulting solution is combined with an aqueous solution of emulsifier (E) with application of shearing forces, and the organic solvent is distilled off.

* * * * *